US010989786B2

(12) United States Patent
Wang et al.

(10) Patent No.: US 10,989,786 B2
(45) Date of Patent: Apr. 27, 2021

(54) OUTDOOR LOCALIZATION USING HOTSPOT LABELS

(71) Applicant: SAP SE, Walldorf (DE)

(72) Inventors: Jin Wang, Singapore (SG); Jun Luo, Singapore (SG); Sinno Jialin Pan, Singapore (SG)

(73) Assignee: SAP SE, Walldorf (DE)

( * ) Notice: Subject to any disclaimer, the term of this patent is extended or adjusted under 35 U.S.C. 154(b) by 1155 days.

(21) Appl. No.: 15/393,231

(22) Filed: Dec. 28, 2016

(65) Prior Publication Data

US 2018/0181879 A1    Jun. 28, 2018

(51) Int. Cl.
| | |
|---|---|
| *G01S 5/02* | (2010.01) |
| *H04W 48/14* | (2009.01) |
| *G06N 20/00* | (2019.01) |
| *H04W 64/00* | (2009.01) |
| *H04W 84/12* | (2009.01) |
| *G01S 5/00* | (2006.01) |

(52) U.S. Cl.
CPC ............ *G01S 5/0252* (2013.01); *G06N 20/00* (2019.01); *H04W 48/14* (2013.01); *H04W 64/00* (2013.01); *G01S 5/0027* (2013.01); *G01S 5/0205* (2013.01); *H04W 84/12* (2013.01)

(58) Field of Classification Search
CPC ...... G06N 20/00; H04W 64/00; H04W 48/14; H04W 84/12; G01S 5/0252; G01S 5/0205; G01S 5/0027
See application file for complete search history.

(56) References Cited

U.S. PATENT DOCUMENTS

| | | | | |
|---|---|---|---|---|
| 8,402,397 | B2 * | 3/2013 | Robles | G06F 30/398 |
| | | | | 716/52 |
| 9,622,152 | B2 * | 4/2017 | Kronander | H04W 16/14 |
| 10,111,031 | B2 * | 10/2018 | Blowers | H04W 4/021 |
| 2006/0217131 | A1 * | 9/2006 | Alizadeh-Shabdiz | ....... |
| | | | | H04W 64/003 |
| | | | | 455/456.1 |
| 2007/0167173 | A1 * | 7/2007 | Halcrow | H04W 4/029 |
| | | | | 455/456.2 |
| 2007/0167174 | A1 * | 7/2007 | Halcrow | H04W 48/16 |
| | | | | 455/456.2 |
| 2009/0097772 | A1 * | 4/2009 | Zhao | G06K 9/6248 |
| | | | | 382/263 |
| 2013/0070644 | A1 * | 3/2013 | McCann | H04W 48/16 |
| | | | | 370/255 |

(Continued)

OTHER PUBLICATIONS

Groping: Geomagnetism and cROwdsensing Powered Indoor NaviGation Zang et al. (Year: 2015).*

(Continued)

*Primary Examiner* — Kakali Chaki
*Assistant Examiner* — Ababacar Seck
(74) *Attorney, Agent, or Firm* — Klarquist Sparkman, LLP (57) ABSTRACT

Described herein is a framework for outdoor localization. In accordance with one aspect of the framework, a set of hotspot labels are received from one or more user devices connected to an outdoor wireless local area network. Manifold learning may be performed based on the set of hotspot labels to construct one or more manifolds. Using the one or more constructed manifolds, the framework may then estimate a location of a particular user device associated with a query record received from during an online location query.

19 Claims, 10 Drawing Sheets

(56) References Cited

U.S. PATENT DOCUMENTS

| | | | |
|---|---|---|---|
| 2016/0021503 A1* | 1/2016 | Tapia | G01S 5/02 |
| | | | 455/456.1 |
| 2016/0028605 A1* | 1/2016 | Gil | H04W 4/38 |
| | | | 709/213 |
| 2016/0295360 A1* | 10/2016 | Jones | G01S 5/02 |
| 2020/0125695 A1* | 4/2020 | Shao | G06F 30/398 |

OTHER PUBLICATIONS

Manifold Locally Linear Denoising for Wi-Fi RSS Based Indoor Positioning Shen et al. (Year: 2016).*

Extensions of Laplacian Eigenmaps for Manifold Learning Avner Halevy (Year: 2011).*

Locally Linear Embedding for Node Localization in Wireless Sensor Networks Jain (Year: 2015).*

Paramvir Bahl et al., "RADAR: An In-building RF-based User Location and Tracking System", Proceedings in IEEE INFOCOM 2, Jan. 2000, IEEE.

Arvind Thiagarajan et al., "VTrack: Accurate, Energy-aware Road Traffic Delay Estimation Using Mobile Phones", SenSys '09 Proceedings of the 7th ACM Conference on Embedded Networked Sensor Systems, Nov. 2009, pp. 85-98, ACM, Berkeley, California.

Arvind Thiagarajan et al., "Accurate, Low-Energy Trajectory Mapping for Mobile Devices", NSDI'11 Proceedings of the 8th USENIX Conference on Networked Systems Design and Implementation, Mar. 30-Apr. 1, 2011, pp. 267-280, USENIX Association, Boston, MA.

Alex Varshavsky et al., "The SkyLoc Floor Localization System", PERCOM '07 Proceedings of the Fifth IEEE International Conference on Pervasive Computing and Communications, Mar. 2007, pp. 125-134, IEEE Computer Society, Washington, DC, USA.

Yin Chen et al., "FM-based Indoor Localization", MobiSys '12 Proceedings of the 10th International Conference on Mobile Systems, Applications, and Services, Jun. 2012, pp. 169-182, ACM, Low Wood Bay, Lake District, UK.

Martin Azizyan et al., "SurroundSense: Mobile Phone Localization via Ambience Fingerprinting", MobiCom '09 Proceedings of the 15th Annual International Conference on Mobile Computing and Networking, Sep. 2009, pp. 261-272, ACM, Beijing, China.

Stephen P. Tarzia et al., "Indoor Localization without Infrastructure using the Acoustic Background Spectrum", MobiSys '11 Proceedings of the 9th International Conference on Mobile Systems, Applications, and Services, 2011, pp. 155-168, ACM, Bethesda, Maryland, USA.

Chi Zhang et al., "GROPING: Geomagnetism and cROwdsensing Powered Indoor NaviGation", IEEE Transactions on Mobile Computing, Feb. 2015, pp. 387-400, vol. 14, No. 2, IEEE.

Yu-Chung Cheng et al., "Accuracy Characterization for Metropolitan-scale Wi-Fi Localization", MobiSys '05 Proceedings of the 3rd International Conference on Mobile Systems, Applications, and Services, 2005, pp. 233-245, ACM, Seattle, Washington.

Arvin Wen Tsui et al., "Accuracy Performance Analysis between War Driving and War Walking in Metropolitan Wi-Fi Localization", IEEE Transactions on Mobile Computing, Nov. 2010, pp. 1551-1562, vol. 9, No. 11, IEEE.

Jeffrey Junfeng Pan et al., "A Manifold Regularization Approach to Calibration Reduction for Sensor-Network Based Tracking", AAAI'06 Proceedings of the 21st National Conference on Artificial Intelligence—vol. 1, 2006, pp. 988-993, AAAI Press, Boston, Massachusetts.

Kaikai Liu et al., "Guoguo: Enabling Fine-grained Indoor Localization via Smartphone", MobiSys '13 Proceeding of the 11th Annual International Conference on Mobile Systems, Applications, and Services, Jun. 2013, pp. 235-248, ACM, Taipei, Taiwan.

Deepak Vasisht et al., "Decimeter-Level Localization with a Single WiFi Access Point", Proceedings of the 13th Usenix Conference on Networked Systems Design and Implementation, Mar. 2016, pp. 165-178, USENIX Association, Santa Clara, CA.

Jun Luo et al., "Non-Interactive Location Surveying for Sensor Networks with Mobility-Differentiated ToA", INFOCOM 2006. 25th IEEE International Conference on Computer Communications, Apr. 2006, IEEE.

Krishna Chintalapudi et al., "Indoor Localization Without the Pain", MobiCom '10 Proceedings of the Sixteenth Annual International Conference on Mobile Computing and Networking, Sep. 2010, pp. 173-184, ACM, Chicago, Illinois, USA.

Fan Li et al., "A Reliable and Accurate Indoor Localization Method Using Phone Inertial Sensors", UbiComp '12 Proceedings of the 2012 ACM Conference on Ubiquitous Computing, Sep. 2012, pp. 421-430, ACM, Pittsburgh, Pennsylvania.

Jeffrey Junfeng Pan et al., "Online Co-Localization in Indoor Wireless Networks by Dimension Reduction", AAAI'07 Proceedings of the 22nd National Conference on Artificial Intelligence, Jul. 2007, pp. 1102-1107, vol. 2, AAAI Press, Vancouver, British Columbia, Canada.

Nirupama Bulusu et al., "GPS-less Low Cost Outdoor Localization for Very Small Devices", IEEE Personal Communications, Oct. 2000, pp. 28-34, vol. 7, No. 5, IEEE.

Dragos Niculescu et al., "DV Based Positioning in Ad Hoc Networks", Telecommunications Systems, Jan. 2003, pp. 267-280, vol. 22, No. 1-4, Kluwer Academic Publishers, Norwell, MA, USA.

Tian He et al., "Range-Free Localization Schemes for Large Scale Sensor Networks1", MobiCom '03 Proceedings of the 9th Annual International Conference on Mobile Computing and Networking, Sep. 2003, pp. 81-95, ACM, San Diego, CA, USA.

Moustafa Youssef et al., "The Horus WLAN Location Determination System", MobiSys '05 Proceedings of the 3rd International Conference on Mobile Systems, Applications, and Services, Jun. 2005, pp. 205-218, ACM, Seattle, Washington.

WiGLE, "WiGLE: Wireless Network Mapping", https://wigle.net/, retrieved online on Mar. 16, 2017.

Openbmap, "OpenBMap Project", https://radiocells.org/, retrieved online on Mar. 16, 2017.

Skyhook, "Skyhook Precision Location", http://www.skyhookwireless.com/products/precision-location, retrieved online on Mar. 16, 2017.

Google, "Google Maps Mobile", https://www.google.com/Intl/en_uk/mobile/maps/, retrieved online on Mar. 16, 2017.

Foursquare, "FourSquare—About Us", https://foursquare.com/about, retrieved online on Mar. 16, 2017.

Google, "The Google Maps Geolocation API", https://developers.google.com/maps/documentation/geolocation/intro, retrieved online on Mar. 16, 2017.

* cited by examiner

HOTSPOTS DENSITY AND NUMBER OF HOTSPOTS PER RECORD

| Area | Hotspots Density (APs/km²) | # Hotspots per record | | |
|---|---|---|---|---|
| | | Mean | Standard Deviation | Median |
| Downtown | 30400 | 51.32 | 32.99 | 41 |
| Campus | 32900 | 88.42 | 36.08 | 91 |
| Hybrid Residential Area | 27300 | 32.17 | 6.95 | 31 |
| Residential Blocks | 29800 | 38.77 | 12.21 | 38 |
| Community Area | 18800 | 35.90 | 15.89 | 32 |
| Downtown Entertainment | 26100 | 48.21 | 31.14 | 41 |

*Fig. 5*

(a) Processing time as a function of number of hotspots/records.

(b) Processing time distribution.

(a) Processing time as a function of number of hotspots/records.

(b) Processing time distribution.

Fig. 8

(a) Median errors for the first 4 areas under different sampling rates.

(b) Mean and standard deviation of distance between two consecutive records for different sampling rates.

Fig. 11

OUTDOOR LOCALIZATION USING HOTSPOT LABELS

TECHNICAL FIELD

The present disclosure relates generally to computer systems, and more specifically, to a framework for outdoor localization using hotspot labels.

BACKGROUND

Although WiFi has been intensively used for the purpose of indoor localization, global positioning system (GPS) technology still dominates the outdoor market. Nevertheless, the landscape of outdoor localization is shifting due to the high-energy consumption of embedded GPS sensors (e.g., in smartphones) and frequent loss of signal in urban areas. Supplementary location indicators, such as general radio frequency (RF) signal, light, sound and magnetic field, can be explored indoors, but they either lose their location discriminability (e.g., light, sound, and magnetic field) or offer very low localization accuracy due to the sparse deployment of signal sources (e.g., cellular and frequency modulation or FM).

While the majority of research efforts focus on indoor localization, quite a few industrial practices have already started to provide GPS-free outdoor localization services based on WiFi infrastructure. Unfortunately, neither academic proposals nor industrial practices have achieved a satisfactory localization accuracy so far. Most academic proposals are trying to migrate the WiFi fingerprinting methods proven to be effective indoors to a metropolitan area, but fingerprinting such a huge area through war driving is extremely difficult (if not impossible), and the localization algorithms adapted to sequential war driving labels (e.g., particle filter) do not work well for crowdsensed labels possibly due to absence of sequential timestamps. More importantly, localization does not work beyond the fingerprinted zones.

SUMMARY

A framework for outdoor localization is described herein. In accordance with one aspect of the framework, a set of hotspot labels are received from one or more user devices connected to an outdoor wireless local area network. Manifold learning may be performed based on the set of hotspot labels to construct one or more manifolds. Using the one or more constructed manifolds, the framework may then estimate a location of a particular user device associated with a query record received from during an online location query.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for outdoor localization is described herein. The present framework presents an integrated solution that uses crowdsensed hotspot labels for improving outdoor localization accuracy based on outdoor wireless local area network (e.g., WiFi) infrastructure. Equipped with a large amount of label data, the framework takes a holistic view on all such data collected within a metropolitan area (or a sub-area) and processes the label data based on semi-supervised manifold learning techniques. Assuming all labels are perfect (with each label produced by a mobile device 6 for a hotspot Θ containing a tuple of {location of δ, Received Signal Strength Indicator (RSSI) from Θ to δ}), the locations of all mobile devices and hotspots should lie on a low-dimensional Euclidean space, such as two-dimensional (2D) or three-dimensional (3D) manifold. Although imperfect labels (in terms of both location and RSSI) may "bend" the original space into a much higher dimension, it is highly possible that those locations still lie on some low-dimensional manifold structure. Therefore, the framework aims to discover this low-dimensional manifold structure so as to recover the true locations of the both users and WiFi hotspots.

In some implementations, the framework provides a preprocessing method to filter the labels so that outliers that may significantly deviate from the ground truth may be removed. The framework may further provide a manifold learning scheme to holistically synthesize all filtered labels belonging to a certain metropolitan area so as to locate both user and WiFi hotspots. The framework may additionally provide an online localization approach that takes into account only a small subset of labels when processing location queries, so as to improve efficiency while preserving localization accuracy. The framework may further generate hotspot positions that provide guidance for users to look for better WiFi performance.

Advantageously, the present framework does not take into account labels as fingerprints, since it is almost impossible to extend indoor localization mechanisms by fingerprinting metropolitan areas. The framework further avoids oversimplified local synthesis methods (e.g., centroid-based) that significantly lose the information contained in the labels. Instead, the framework accommodates the labeled and unlabeled data for a given area using a semi-supervised manifold learning technique, and the output concerning the unlabeled part becomes the estimated locations for both user (or user devices) and WiFi hotspots. Extensive experiments have been conducted in several outdoor areas, and the results strongly indicated the efficacy of the present framework.

It should be appreciated that the framework described herein may be implemented as a method, a computer-controlled apparatus, a computer process, a computing system, or as an article of manufacture such as a computer-usable medium. These and various other features and advantages will be apparent from the following description.

Figure 1:
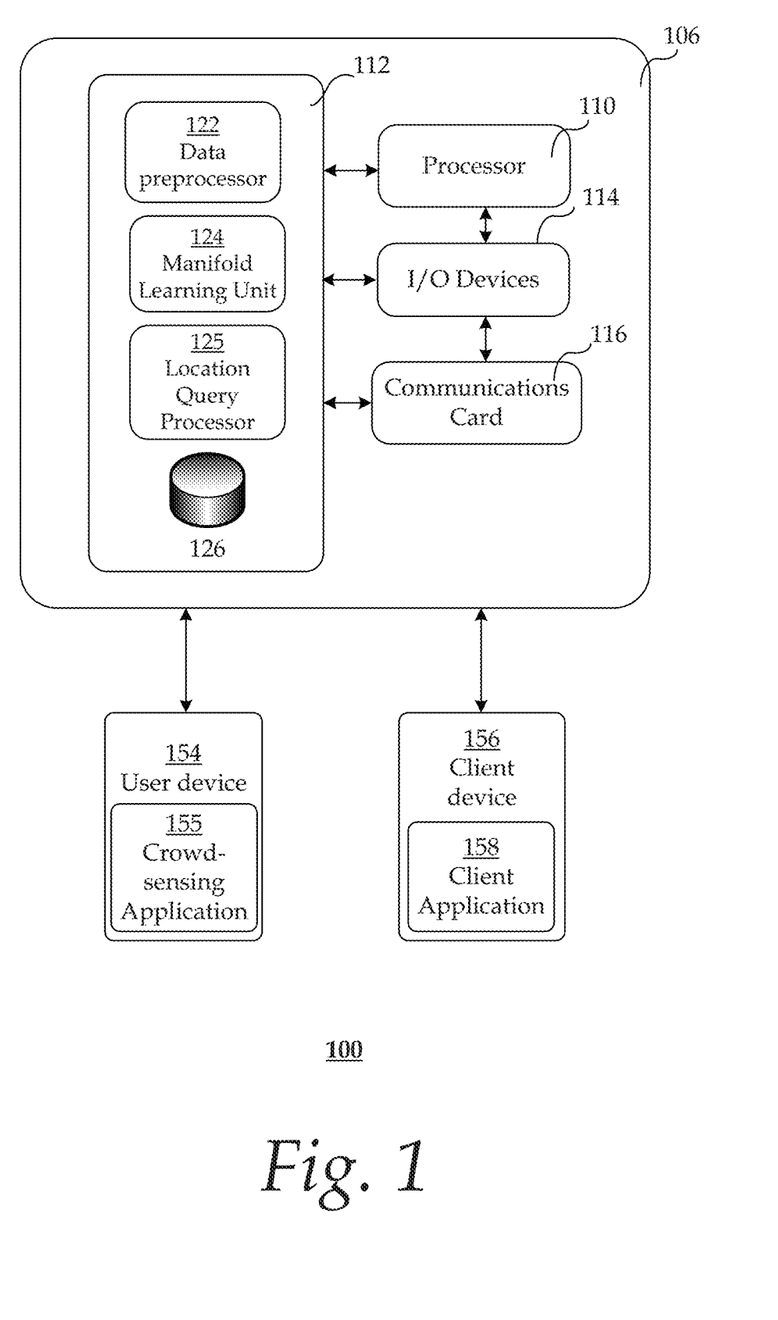
FIG. 1 is a block diagram illustrating an exemplary architecture.

FIG. 1 is a block diagram illustrating an exemplary architecture 100 in accordance with one aspect of the present framework. Generally, exemplary architecture 100 may include a computer system 106, one or more user devices 154 and one or more client devices 156.

Computer system 106 may include a processor 110, input/output (I/O) devices 114 (e.g., touch screen, keypad, touch pad, display screen, speaker, etc.), a memory module 112, and a communications card or device 116 (e.g., modem and/or network adapter) for exchanging data with a network (e.g., local area network or LAN, wide area network (WAN), Internet, etc.). It should be appreciated that the different components and sub-components of the computer system 106 may be located or executed on different machines or systems. For example, a component may be executed on many computer systems connected via the network at the same time (i.e., cloud computing).

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks or cards, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor 110. As such, computer system 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly (or machine) language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 includes a data preprocessor 122, a manifold learning unit 124, a location query processor 125 and a database 126. Preprocessor 122 serves to preprocess labels received from the user device 154. Manifold learning unit 124 serves to perform manifold learning based on the preprocessed labels to construct one or more manifolds. Location query processor 125 serves to process online location queries based on the one or more constructed manifolds. Database 126 serves to store data, such as hotspot labels, preprocessed and processed labels, manifolds, and so forth.

Computer system 106 may operate in a networked environment using logical connections to one or more user devices 154 and one or more client devices 156. User device 154 may be a smart phone, laptop, tablet or other mobile device capable of connecting to an outdoor wireless local area network (e.g., WiFi network). User device 154 may include a crowdsensing application 155 configured to discover hotspots and record labels associated with the hotspots. Client device 156 may include a client application 158 configured to present a user interface (e.g., graphical user interface) to query and access information and services provided by the computer system 106. The client application 158 may also be configured to discover hotspots and record labels associated with the hotspots.

Figure 2:
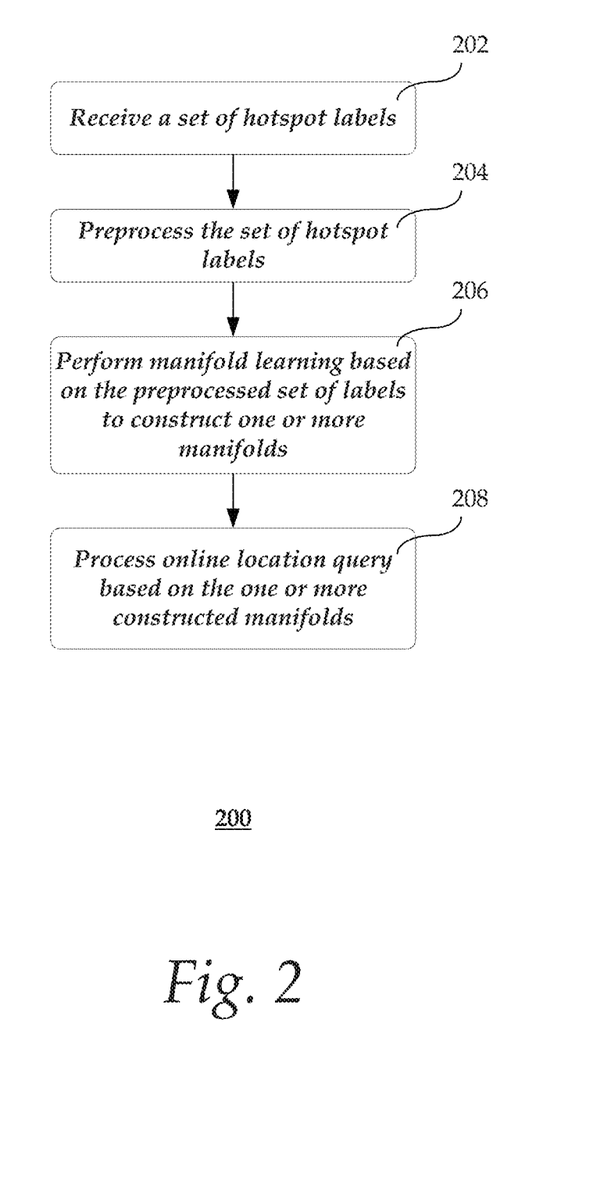
FIG. 2 shows an exemplary method 200 for outdoor localization.

FIG. 2 shows an exemplary method 200 for outdoor localization. The method 200 may be performed automatically or semi-automatically by the system 100, as previously described with reference to FIG. 1. It should be noted that in the following discussion, reference will be made, using like numerals, to the features described in FIG. 1.

At 202, data preprocessor 122 receives a set of hotspot labels. The set of hotspot labels may be received from a crowdsensing application 155 installed on one or more user devices 154. The crowdsensing application 155 may initiate a hotspot discovery process according to one or more predefined schedules (e.g., triggered by a significant location change). The crowdsensing application 155 may record in a label, for each hotspot discovered during the hotspot discovery process, the Basic Service Set Identifier (BSSID), Service Set Identifier (SSID) and Received Signal Strength Indicator (RSSI). The crowdsensing application 155 may also obtain its own location (e.g., latitude, longitude) along with GPS signal statistics (e.g., accuracy represented by confidence range, and number of satellites) and corresponding timestamp for each discovered hotspot. All this information associated with a given hotspot may constitute a label. A record contains a set of labels collected by a user device 154 at a given time, and a log includes a sequence of records from the same user device 154.

At 204, data preprocessor 122 preprocesses the set of hotspot labels. Since a log is recorded in real-time while the user device 154 is moving, any two consecutive labels in a log should record locations spatially near enough to each other. However, GPS signal sometimes gets lost or shifts a lot in metropolitan areas. Data preprocessor 122 may remove or filter out labels with significant shifts or errors in location from the original set of labels. To eliminate such labels, data preprocessor 122 may first mark labels with very few satellites or a large confidence range as "suspicious". Out of these suspicious labels, those labels with a change in distance and/or velocity greater than a predetermined threshold are then eliminated to avoid potential errors caused by inaccurate GPS locations.

In addition, data preprocessor 122 may remove from the set of labels two types of mobile hotspots: (i) personal hotspots; and (2) public transport hotspots. Normally, a fixed hotspot has a signal range of about 100 meters, such that a clustering algorithm (e.g., density-based spatial clustering of applications with noise (DBSCAN)) may be applied on all label locations for each hotspot. Assuming that there are k labels available for a given hotspot, the minimum points of cluster may be set to 0.8k and the maximum distance may be set to 200 meters. If all the points are finally labeled as "noise" after DBSCAN, it means the detected locations for the hotspot are too sparsely distributed, and the hotspot is highly likely to be mobile. The database 126 may be maintained by keeping a record of all the mobile hotspots discovered, and avoiding the use of such mobile hotspots in subsequent processing.

The size of the database 126 may be limited to achieve an efficient computation in subsequent processing by combining labels with the same or similar locations (e.g., within a predefined distance such as 1 meter). More particularly, labels with the same or similar locations may be combined into one label by averaging the RSSI for each hotspot. The number of combined labels is recorded for further combination. For any new label inserted into the database 126, a same-location check/combination is performed to minimize the size of the database 126.

After filtering the labels, data preprocessor 122 may construct a signal matrix S for all remaining labels in the set. Assuming that there are n hotspots detected in m records, S will be an m×n matrix, and $$S = \begin{pmatrix} s_{11} & \cdots & s_{1n} \\ \vdots & \ddots & \vdots \\ s_{m1} & \cdots & s_{mn} \end{pmatrix} \quad (1)$$

wherein $s_{ij}$ represents the RSSI for the j-th hotspot in the i-th label (or record). Each column represents one hotspot, and each row represents one label. The blank cells may be filled with a small default value $s_{min}$. Locations of records are maintained using a m×2 matrix, $u=[u_1, \ldots, u_m]'$ wherein $$u_i = \begin{matrix} u_{ix} \\ u_{iy} \end{matrix} \quad (2)$$

Given the signal matrix S, the goal is, for any new label $s_{m+1} \in \mathbb{R}^{1 \times n}$ to estimate the user (or user device) location $u_{m+1}$. It turns out that, as a byproduct, the hotspot locations $h=[h_1, \ldots, h_n]$ may be obtained simultaneously, wherein $$h_i = \begin{matrix} h_{ix} \\ h_{iy} \end{matrix} \quad (3)$$

At 206, manifold learning unit 124 performs manifold learning based on the preprocessed set of labels to construct one or more manifolds. The construction of manifolds is based on three facts: (i) two nearby locations receive similar signal strengths from surrounding hotspots; (ii) a user device 154 receives similar signal strength from two hotspots near to each other; and (iii) the nearer a user device 154 is to a hotspot, the stronger the signal received will be. In the present context, these facts translate to: (i) if each row of signal matrix S is represented as a point in n-dimensional space, two locations, $u_i$ and $u_j$, spatially near in the real world should be close to each other in the n-dimensional space; (ii) if each column of signal matrix S is represented as a point in m-dimensional space, two hotspots, $h_i$ and $h_j$, spatially near in the real world should be close to each other in the m-dimensional space; and (iii) the larger $s_{ij}$ is, the nearer the j-th hotspot is to the location of the i-th record.

Manifold learning may be implemented using a Laplacian Eigenmaps method for dimensionality reduction. This method relies on the basic assumption that the data lies in a low-dimensional manifold in a high-dimensional space. The Laplacian Eigenmaps method builds a graph from neighborhood information of the data set. Each data point serves as a node on the graph and connectivity between nodes is governed by the proximity of neighboring points (e.g. using the K-nearest neighbor algorithm). The graph thus generated can be considered as a discrete approximation of the low-dimensional manifold in the high-dimensional space. Minimization of a cost function based on the graph ensures that points close to each other on the manifold are mapped close to each other in the low-dimensional space, preserving local distances.

More particularly, manifold learning unit 124 may first construct a user device (or user) location manifold $A_u$ and a hotspot location manifold $A_h$ from the signal matrix S. Neighborhood relationship may be derived using the K-Nearest-Neighbor (KNN) method. Since the signal strength (or RSSI) and distance are not linearly related, RSSI values in the signal matrix S are converted to weights $\tilde{s}_{ij}$ using a non-linear transformation:

$$\tilde{s}_{ij} = \exp\left(-\frac{(s_{ij} - s_{max})^2}{2\sigma^2}\right) \quad (4)$$

wherein σ is the Gaussian kernel width, $\tilde{s}_{ij}$ and $s_{ij}$ represent the weight and RSSI respectively for the j-th hotspot in the i-th label (or record). $s_{max}$ is the maximum RSSI a user device 154 can receive in an outdoor environment, which indicates a significantly close distance between user device 154 and hotspot. Empirically, $s_{max}$ may be set to −30 dBm and σ may be set to 12 based on the crowdsensed data. Note that σ affects the spatial density of hotspots: the larger σ is, the more sparsely distributed the hotspots are.

Since geographic locations for user devices are known, a great-circle distance may be used as the metric for constructing the user location manifold $A_u$. For the hotspots location manifold $A_h$, the Euclidean distance between column vectors in $\tilde{s}_{ij}$ may be used as the metric. Accordingly, for each manifold ($A_u$ and $A_h$), a weighted adjacency matrix A* is constructed, wherein each element of the matrix A* is as follows:

$$a_{ij} = \exp\left(-\frac{\|\tilde{s}_i - \tilde{s}_j\|^2}{2\sigma^2}\right) \quad (5)$$

if i and j are neighbors in the manifold; otherwise 0. In Equation (5), $a_{ij}$ represents an entry in the adjacency matrix A* for the j-th hotspot in an i-th label, $\tilde{s}_i$ and $\tilde{s}_j$ represent the i-th and j-th column vectors in S, and σ denotes the Gaussian kernel width.

Let $A_u$ be the m×m matrix for the user location manifold and $A_h$ be the n×n matrix for the hotspot location manifold. To combine the two manifolds into one, manifold learning unit 124 may define a unified adjacency matrix:

$$A = \begin{bmatrix} r_u A_u & r_s \tilde{S}_u \\ r_s \tilde{S}'_N & r_h A_h \end{bmatrix} \quad (6)$$

wherein parameters $r_u$, $r_s$ and $r_h$ are set to small positive values induced by harmonic functions on the graph. A represents the relative distances and connectivity among user devices and hotspots based on the three aforementioned facts.

At 208, location query processor 125 processes at least one online location query based on the one or more constructed manifolds. The online location query may be initiated by a client device 156 transmitting a new query record to the location query processor 125 to determine the location of a particular user device and/or hotspot associated with the query record. The query record $s_u$ is associated with an unknown user device location, and includes information associated with a list of one or more hotspots detected by the client application 158 while scanning, including the BSSID, SSID and RSSI of each detected hotspot.

The hotspot location manifold $A_h$, user device location manifold $A_u$ and global location manifold A may be constructed (as discussed previously) offline and stored in the database 126. When processing online location queries, location query processor 125 may avoid involving all labels in the database 126 (i.e., full location manifold A) to improve efficiency, if the queries are geographically confined in a small region. More particularly, in response to receiving a query record from client device 156, location query processor 125 may search through detected hotspots listed in the query record, and retrieve a subset of relevant candidate hotspots from the hotspot location manifold $A_h$ stored in database 126. The subset of relevant hotspots includes only labels associated with all hotspots found in the query record and their neighboring hotspots in the hotspot manifold $A_h$.

The subset of relevant candidate hotspots is used to construct a signal sub-matrix $\tilde{S}$. The signal sub-matrix $\tilde{S}$ contains labels with RSSI values significant enough (i.e., greater than a predetermined threshold value) for any hotspot in the candidate set. A local hotspot manifold $\hat{A}_h$ may be constructed based on signal sub-matrix $\tilde{S}$ and a sub-manifold retrieved from the hotspot manifold $A_h$ computed offline. Additionally, based on the location $\hat{u}$ retrieved from the selected records, location query processor 125 retrieves a user device location sub-manifold $\hat{A}_u$ from the global user device manifold $A_u$ online. The query record is then inserted into the retrieved sub-manifold $\hat{A}_u$ using KNN with Euclidean distance between row vectors in $\tilde{S}$ as distance metrics.

Each of the sub-manifold $\hat{A}_h$ and $\hat{A}_u$ may then be calculated as follows:

$$\hat{a}_{ij} = \exp\left(-\frac{\|\hat{\tilde{s}}_i - \hat{\tilde{s}}_j\|^2}{2\sigma^2}\right) \hat{a}_{ij} \quad (7)$$

$\hat{a}_{ij}$ represents an entry in the sub-manifold for the j-th hotspot in an i-th label, $\hat{\tilde{S}}_i$ and $\hat{\tilde{S}}_j$ represent the i-th and j-th column vectors in sub-matrix $\hat{\tilde{S}}$, and σ denotes the Gaussian kernel width.

After obtaining the sub-manifolds $\hat{A}_h$ and $\hat{A}_u$, location query processor 125 may apply a semi-supervised learning solver to obtain an optimal solution for these local sub-manifolds and return the queried location back to client device 156. By processing a much smaller set of records, the processing time is advantageously reduced and location query processor 125 can advantageously respond to the query in a timelier manner.

More particularly, to solve the hotspot locations and unknown user device locations at one time, a semi-supervised learning solving method may be applied. The sub-manifolds $\hat{A}_h$ and $\hat{A}_u$ may first be combined into a unified sub-manifold Â as follows:

$$\hat{A} = \begin{bmatrix} r_u \hat{A}_u & r_s \hat{\tilde{S}}u \\ r_s \hat{\tilde{S}}'_N & r_h \hat{A}_h \end{bmatrix} \quad (8)$$

wherein parameters $r_u$, $r_s$ and $r_h$ are set to small positive values induced by harmonic functions on the graph.

Given relative locations of users and hotspots represented by sub-manifold Â, known locations denoted by y=[u'; h']', and indication matrix K=diag($k_1$, ..., $k_{m+n}$) where $k_i$=1 if the location of user device (or user) or hotspot is given in y, otherwise $k_i$=0, the objective is to find a set of optimal locations that best fits the current relative patterns and minimizes fitting errors compared to the known locations y. Therefore, the objective is:

$$p^* = \underset{p \in \mathbb{R}^{(m+n)\times 2}}{\mathrm{argmin}} \ (p-y)'K(p-y) + \gamma p'Lp \quad (9)$$

wherein p* denotes the optimal location that satisfies the optimization problem, p is the (m+n)*2 vector that denotes the locations of user devices and hotspots, p' denotes the transpose matrix of p, y denotes known locations, K is the indication matrix, L is the Laplacian graph: L=D−Â where D=diag($d_1$, $d_2$, ..., $d_{m+n}$) with $$d_i = \Sigma_{k=1}^{m+1} \hat{A}_{ik} \quad (10)$$

wherein the second term γ is a regularization term, where γ>0 controls the smoothness of the coordinates along the unified sub-manifold Â.

The problem has a closed-form solution:

$$p^* = (K+\gamma L)^{-1} Ky \quad (11)$$

wherein the optimal location p*=[u*',h*']' yields estimated locations for both user devices and hotspots, K represents the indication matrix, γ is a regularization term, L is the Laplacian graph, and y denotes the known locations.

Figure 3A:
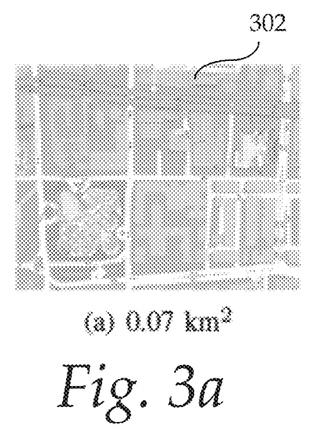
FIGS. 3(a) through 3(f) show the maps of outdoor test areas.
Figure 3B:
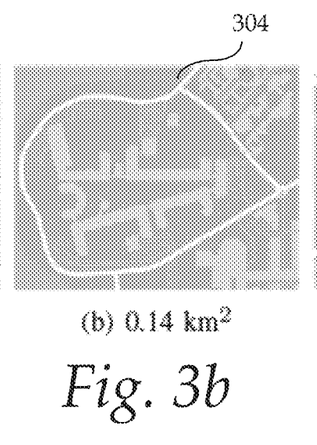
Figure 3C:
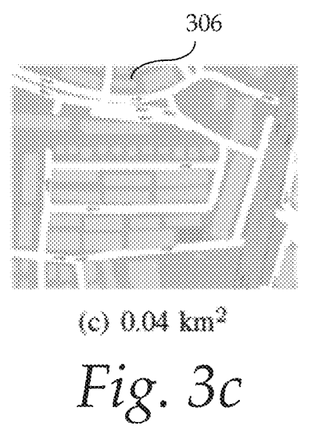
Figure 3D:
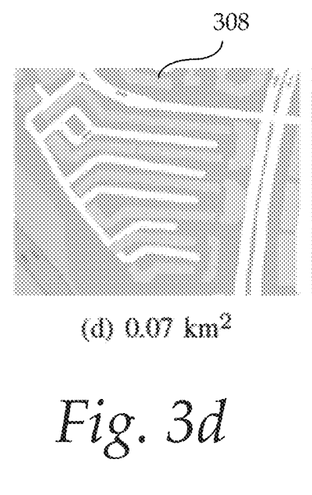
Figure 3E:
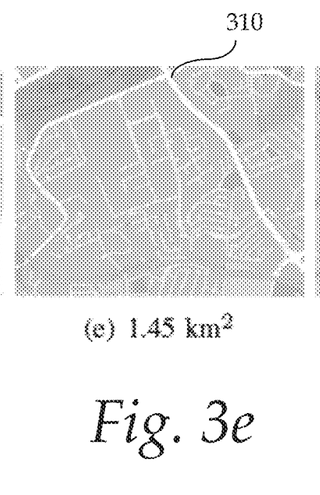
Figure 3F:
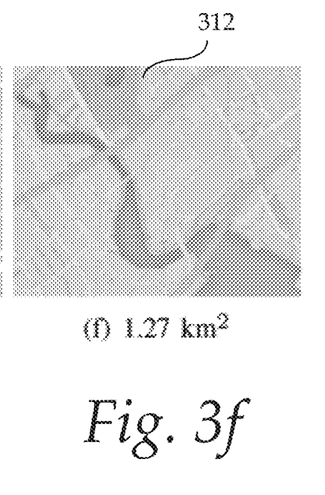

To evaluate the framework, experiments were conducted in the following 6 outdoor areas. FIGS. 3(a) through 3(f) show the maps of these outdoor test areas. More particularly, FIG. 3(a) shows a map 302 of a 0.07 km² downtown area, which is a central business district filled with commercial and business buildings. FIG. 3(b) shows a map 304 of a 0.14 km² campus area that is an educational institute district with buildings in an open area. FIG. 3(c) shows a map 306 of a 0.04 km² hybrid residential area (Hybrid R.A.) that is a medium-density residential neighborhood with a few shops and a community center. FIG. 3(d) shows a map 308 of a 0.07 km² area of residential blocks (R.B.), which is a high-density residential neighborhood filled with high-rise buildings. FIG. 3(e) shows a map 310 of a 1.45 km² community area (C.A.), which contains a mixture of residential high rise buildings, private houses, markets, shopping malls and community centers. As for FIG. 3(f), it shows a map 312 of a 1.27 km² downtown entertainment area (D.E.) that contains high-density of business high-rise buildings, shopping malls, restaurants, and entertainment facilities along a riverside.

As commercial platforms either do not open their databases or have very limited coverage in the city, the crowd-sensing process for the first 4 areas was emulated. An Android application was developed to continuously detect user locations using GPS and scan surrounding WiFi hotspots at 1 Hz. For each hotspots scan, the standard label information was recorded. 6 overlapped sets of data were collected to cover each of the first 4 areas (302, 304, 306 and 308) using different Android phones. The last 2 larger areas (310 and 312) were chosen, as OpenBMap had some coverage in these 2 areas, which allowed the use of OpenBMap raw records uploaded from 2010 to 2016. The records from OpenBMap's online archive were collected from 26 traces of wardriving data with different lengths and speeds, and therefore were rather noisy. The records were heavily pre-processed using the methods described herein. To supplement the OpenBMap's incomplete coverage, supplemental trace data were further collected through cycling so as to cover these areas as much as possible.

50 experiments were conducted for each area. For each experiment, 100 records with high accuracy level (≤10 meters) and sufficient number of satellites (≥8) were selected as the testing set. The locations contained in these records were treated as "ground truth" for evaluation purposes; they were temporarily removed from the records so that they could emulate the location queries issued to computer system 106. The remaining records were used as the crowd-sensed hotspot label data set to construct the manifolds. In total, 5,000 location queries were emulated for each area, providing sufficient data to build statistics for every performance aspect of the present framework. The components in computer system 106 were implemented in Java. For each area, the computer system 106 first builds up a database and constructs manifolds offline, then it accepts location queries in JavaScript Object Notation (JSON) format and returns user locations.

Figure 4:
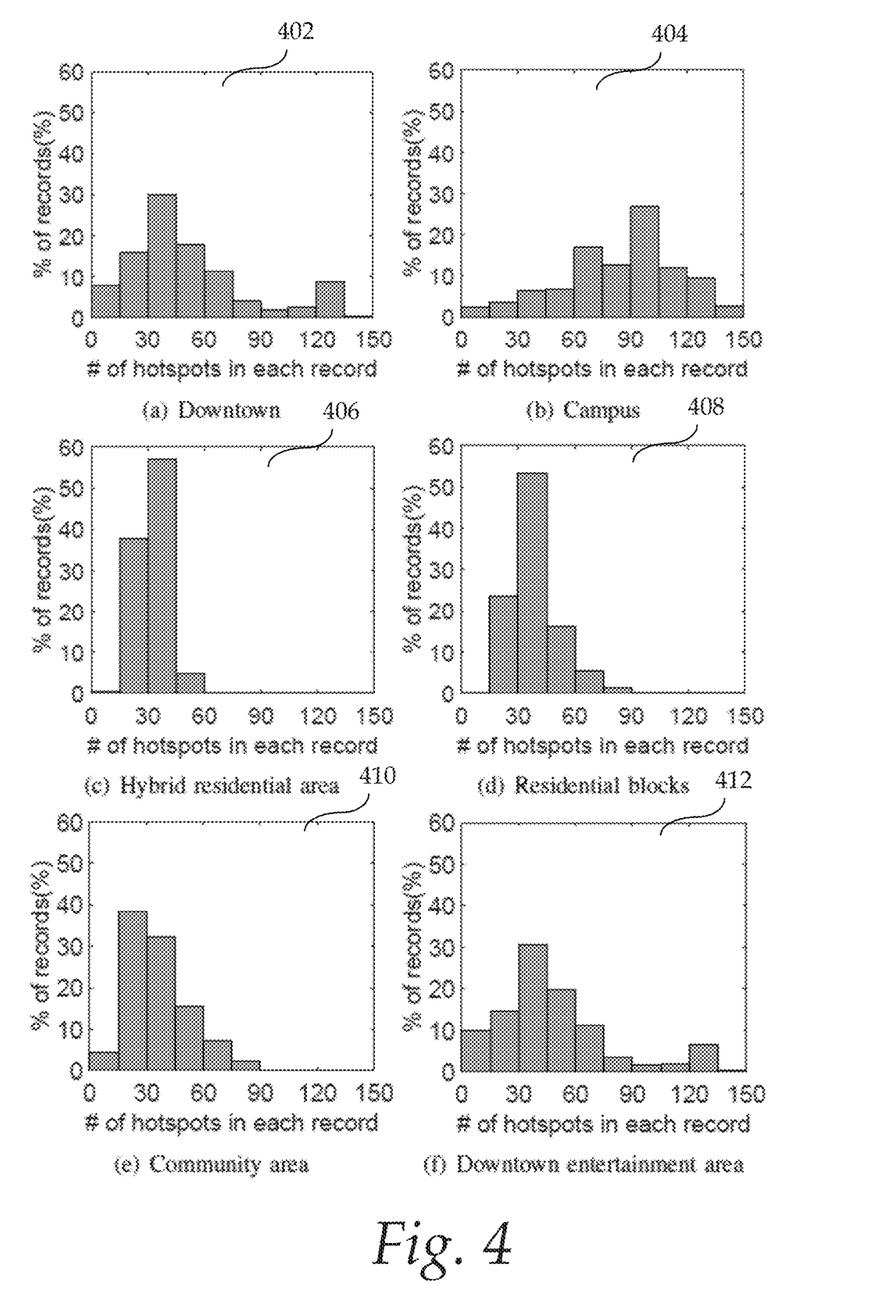
FIG. 4 shows the distributions of the number of hotspots detected per record for each of the 6 areas.

FIG. 4 shows the distributions of the number of hotspots detected per record for each of the 6 areas. More particularly, bar chart 402 shows the distribution of number of hotspots in each record for the downtown area 302; bar chart 404 shows the distribution of number of hotspots in each record for the campus area 304; bar chart 406 shows the distribution of number of hotspots in each record for the hybrid residential area 306; bar chart 408 shows the distribution of number of hotspots in each record for the residential blocks area 308; bar chart 410 shows the distribution of number of hotspots in each record for the community area 310; and bar chart 412 shows the distribution of number of hotspots in each record for the downtown entertainment area 312.

Figure 5:
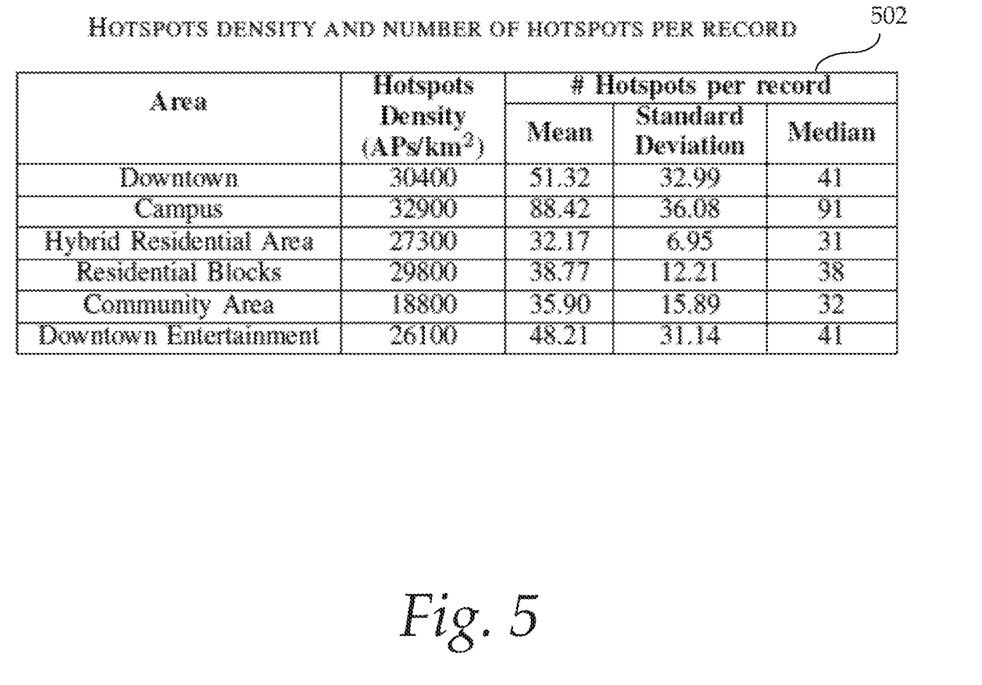
FIG. 5 shows a table containing statistics for hotspots per record for different areas.

FIG. 5 shows a table 502 containing statistics for hotspots per record for the 6 different areas. As expected, downtown area 302 and campus area 304 have higher hotspot densities than the residential areas, where the number of hotspots per record can reach more than 100 in some parts of these areas. Both campus and downtown areas (304, 302) also has a high variance in number of hotspots per record as a result of various heights of buildings and unevenly distributed buildings in the zone. Campus area 304 has generally more hotspots detected per record and highest density, as the hotspots are densely located in such area to achieve high accessibility for all users in the campus. Compared to the hybrid residential area 306, residential blocks area 308 has a denser hotspots distribution as the blocks have more levels and more residents compared with private semi-detached houses in hybrid residential area. Community area 310, as a larger scale of residential area, shares similar properties as the hybrid residential area and residential blocks area. The number of hotspots in the community area is mostly detected in the range of about 15 to 45 hotspots. Downtown entertainment area 312 has almost the same distribution as the downtown area 302, which shows that not only streets and pedestrian streets but also riverside streets are well-equipped with sufficient hotspots. In summary, typical metropolitan areas have sufficient WiFi infrastructures to facilitate outdoor localization if properly used.

Figure 6:
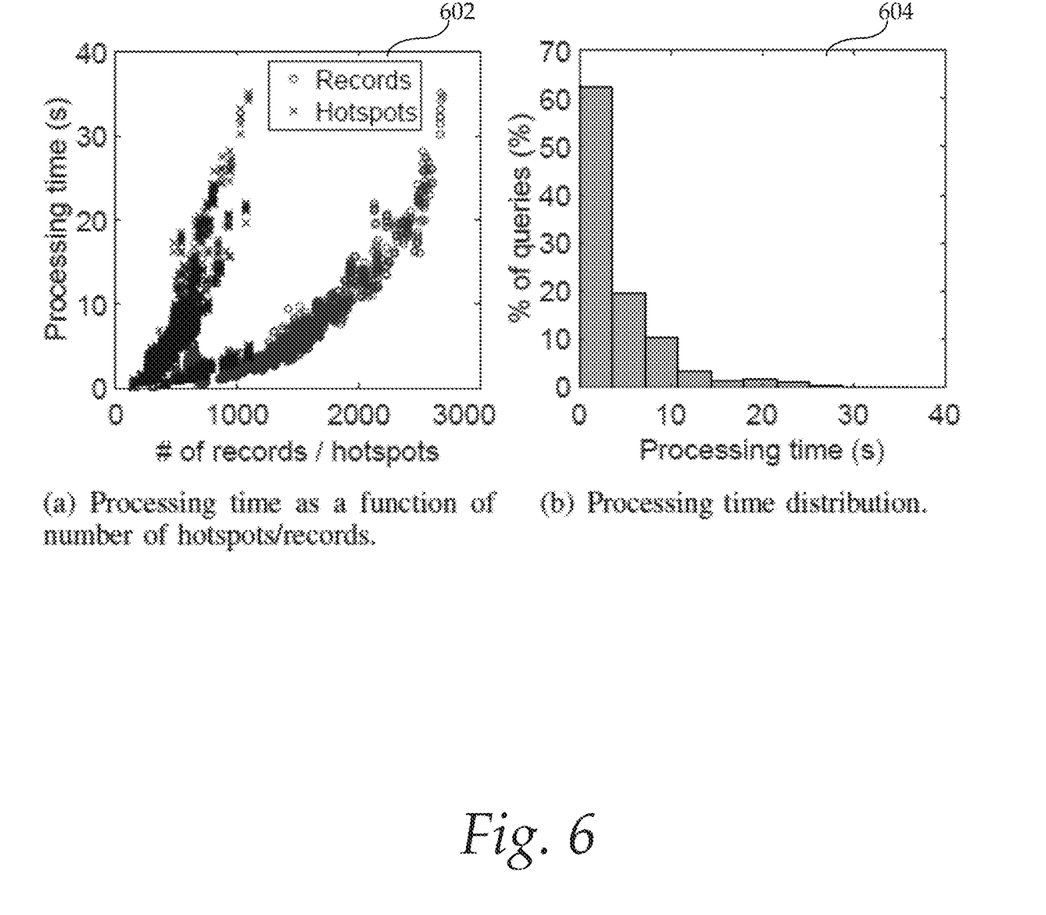
FIG. 6 shows two graphs that represent the processing time using all hotspots in a query and their neighboring hotspots.

Before evaluating the accuracy of the present framework for localization, the system efficiency was first verified. The present framework has two separate processes, namely offline process and online process. During the offline process, logs submitted to the computer system 106 are preprocessed and global manifolds are pre-computed in the computer system 106. This happens when there is a sufficient number of new user logs received. The online process is invoked in response to a user location query. This process involves local manifold construction and location computation. The time to accomplish the online process is the processing time taken by the computer system 106 to return the location back to a user. FIG. 6 shows two graphs 602 and 604 that represent the processing time using all hotspots in a query and their neighboring hotspots. More particularly, graph 602 represents the processing time plotted as a function of number of hotspots involved in online processing. As shown, it exponentially increases with both the number of hotspots and the number of records. Graph 604 shows the processing time distribution. As shown, if all the surrounding hotspots concerned by a location query are retrieved, 70% of the queries in the experiment can be finished within 5 seconds. The mean processing time is 4.22 seconds.

Figure 7:
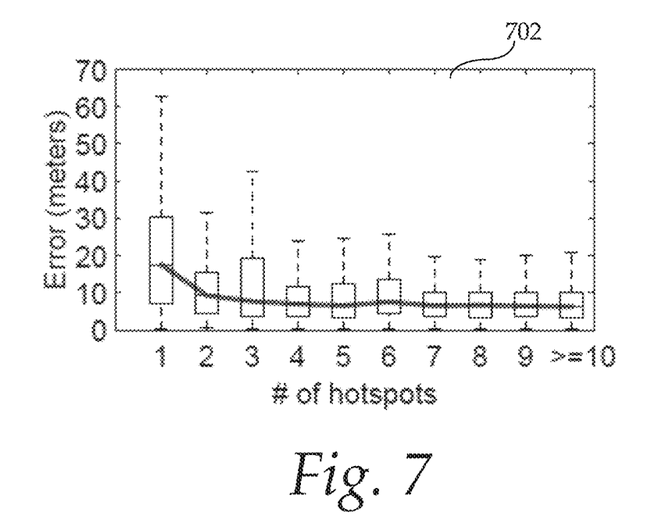
FIG. 7 shows a graph of error statistics as a function of number of candidate hotspots.
Figure 8:
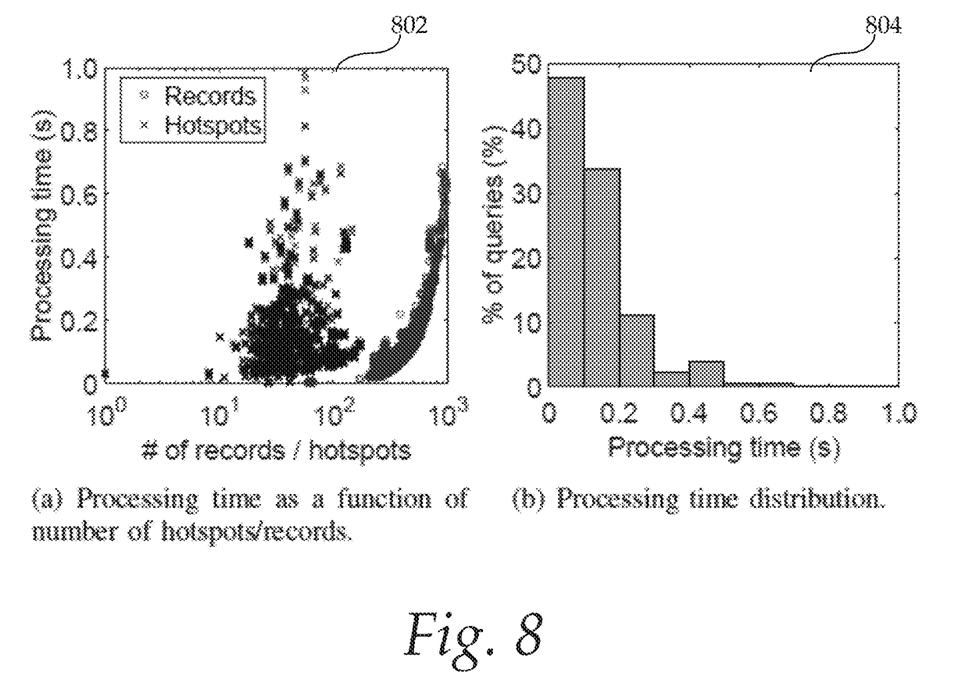
FIG. 8 shows a scatterplot and a bar chart that represent processing time using only hotspots in a query.

To further reduce the processing time, the performance was tested by involving only those hotspots in the query and even a subset of it. The subset was selected based on the RSSI value, and only hotspots with strong RSSI values are used for further processing. FIG. 7 shows a graph 702 of error statistics as a function of number of candidate hotspots. It can be observed from the graph 702 that location accuracy is largely insensitive to the number of candidate hotspots as long as it is sufficiently large (≥6). FIG. 8 shows a scatter plot 802 and a bar chart 804 that represent processing time using only hotspots in a query. As can be observed, after reducing the number of candidate hotspots, the processing time can be reduced to 0.5 seconds (s) for most cases. The mean processing time is 167.86 ms with a standard deviation of 149.91 ms. Therefore, for the following experiments, we only take the hotspots contained in a query as candidates.

To evaluate the accuracy of the present framework for outdoor localization, the median error at different sampling rates was first determined, followed by selecting a sampling rate to evaluate the framework in the following tests. The accuracy of the present framework for outdoor localization was compared with 3 commercial systems available in the market: OpenBMap Offline Localization System, Skyhook Precision Location Service, and Google Location Service.

Figure 9:
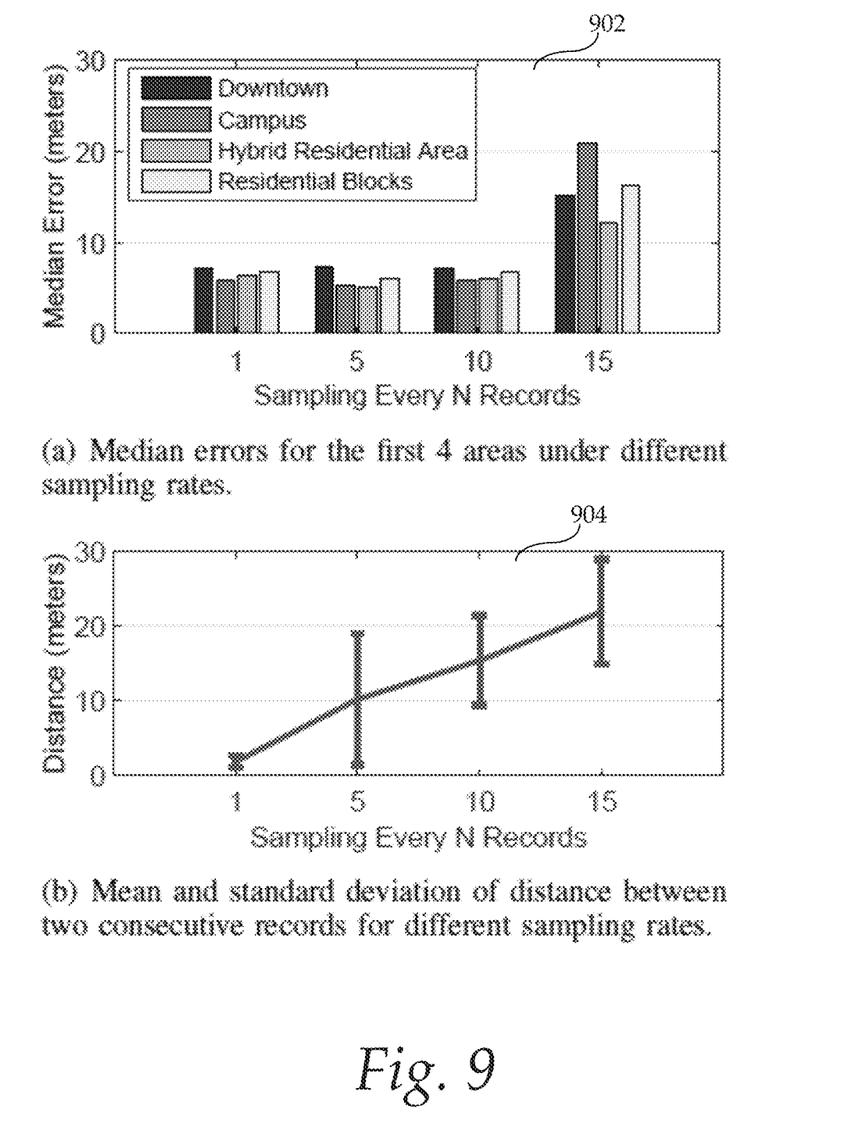
FIG. 9 shows charts that represent results of a performance analysis for different levels of hotspots label granularity.

100 records were selected from experiment data to emulate location queries, and the remaining records were used to emulate a database. The database was resampled with a varying sample rate, i.e., one record for every N records with N=1, 5, 10, 15. This emulates a crowdsensing database at various granularities. FIG. 9 shows charts 902 and 904 that represent results of a performance analysis for different levels of hotspots label granularity. Bar chart 902 shows the median errors for the first 4 areas (302, 304, 306 and 308) with different sampling rates, while chart 904 shows the statistics (i.e., mean and standard deviation) on the distance between two consecutive records for different sampling rates in a down-sampled database. The median errors for N≤10 are all below 10 meters, so all the remaining experiments were conducted under N=10. The increase in median error for N=15 suggests that the WiFi labels may be too sparse for localization purposes.

Figure 10:
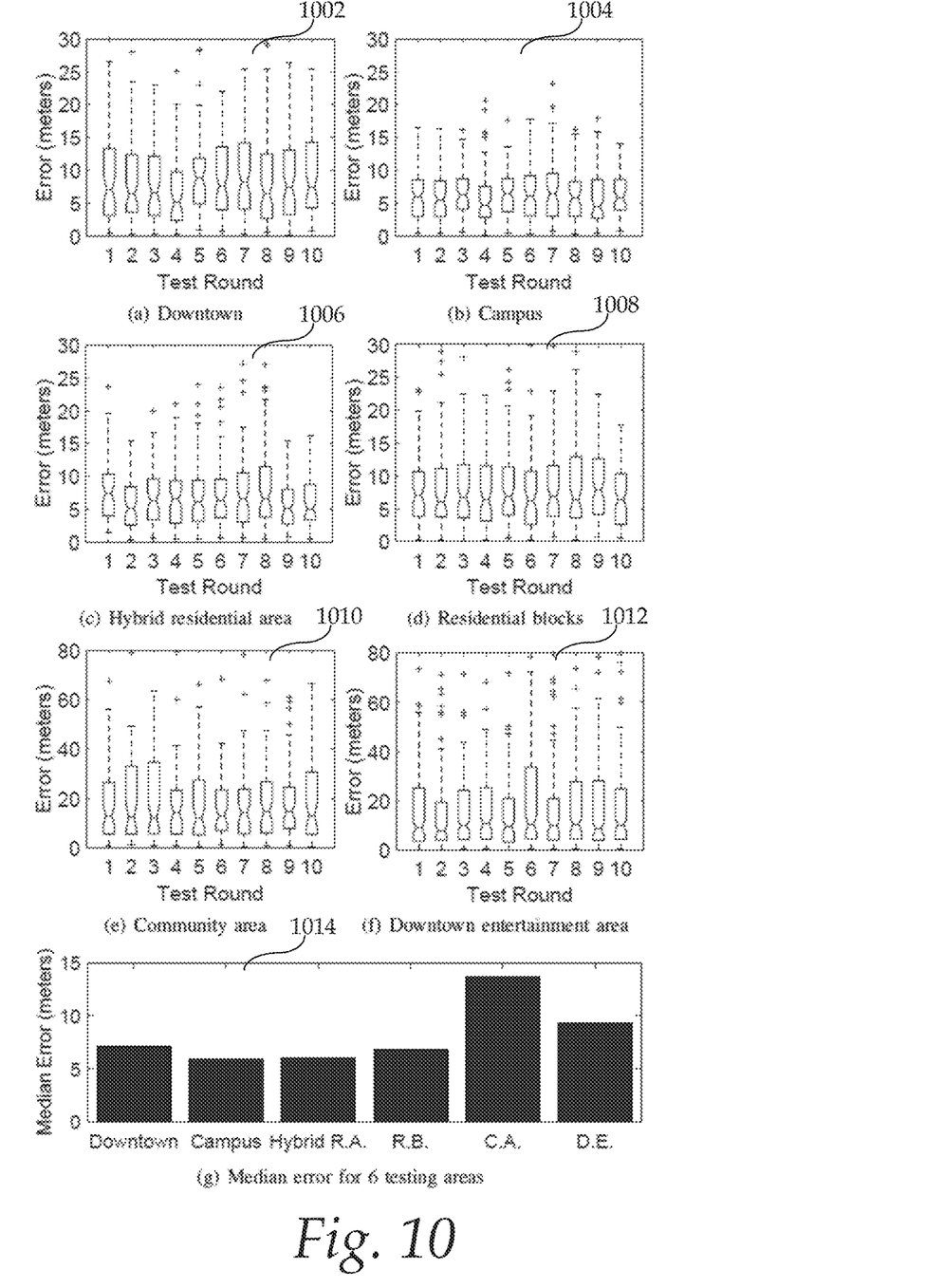
FIG. 10 illustrates the errors (in meters) in estimating user locations using the present framework.

FIG. 10 illustrates the error (in meters) in estimating user location using the present framework. Only results for 10 experiments in each area are reported in FIG. 10. As shown by charts 1002, 1004, 1006 and 1008, the present framework yielded a median error of less than 8 meters for all testing cases in the first 4 areas (302, 304, 306, and 308). 75% of errors reported are less than 15 meters. Normally, an error less than 10 meters can be achieved if the number of hotspots per record is high (e.g., in the Campus 304), whereas errors are expected to be larger in areas with insufficient number of hotspots in record (e.g., in the Downtown 302). As shown by charts 1010 and 1012 for the last 2 larger areas, Community Area 310 has a higher median of 15 meters compared with all other areas. Both charts 1010 and 1012 have high variances due to a low WiFi coverage in such large areas. Bar chart 1014 shows the median error for each of the 6 testing areas. Note that the median errors yielded by the present framework are quite comparable to the accuracy level of GPS, which is about 3 to 7 meters if there is a sufficient number of satellites.

Figure 11:
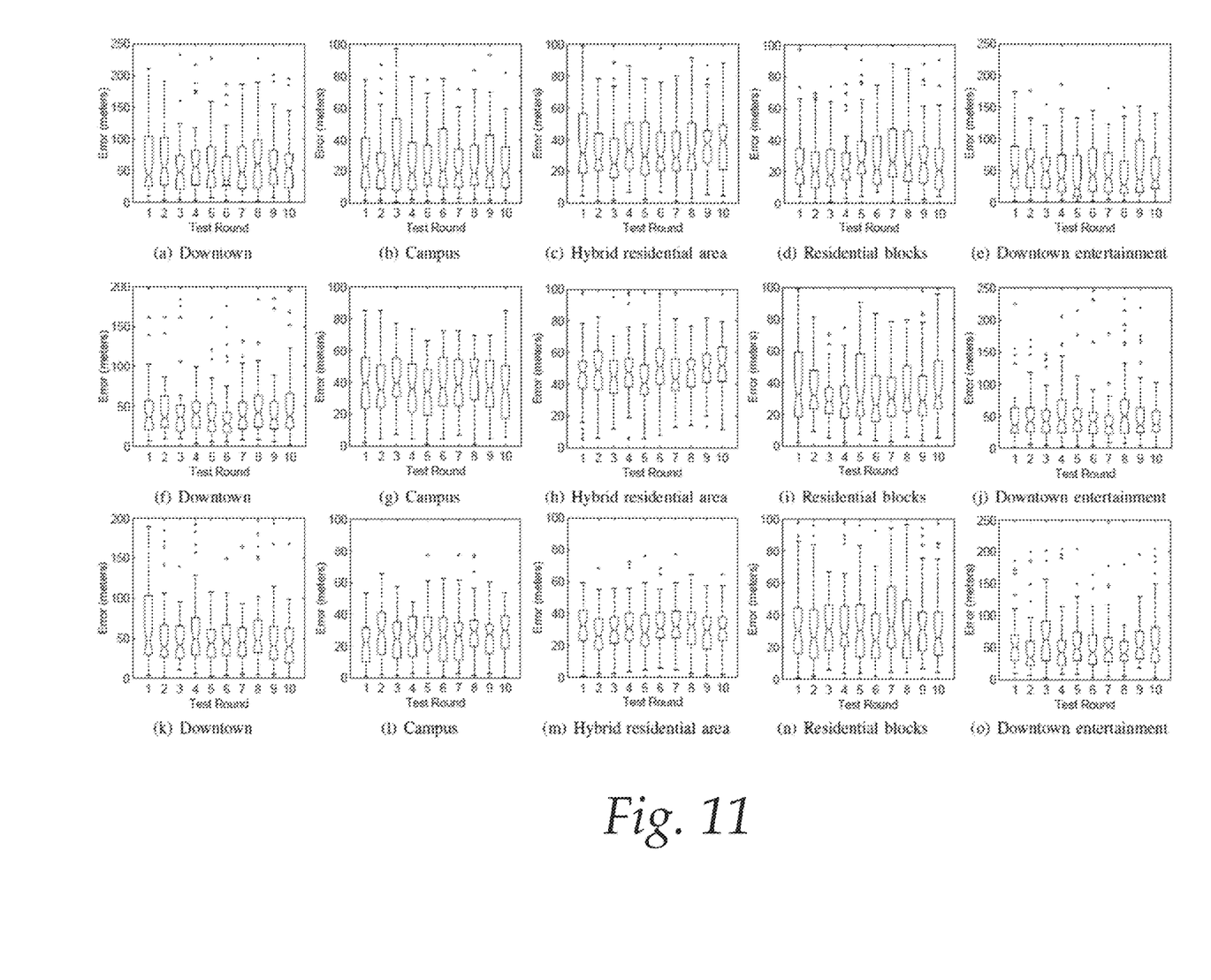
FIG. 11 shows the location error distributions for 3 different systems.

To compare the present framework with current available systems, the same location queries were issued to the 3 systems mentioned earlier, i.e. OpenBMap Offline Localization System, Skyhook Precision Location Service, and Google Location Service. FIG. 11 shows the location error distributions for the 3 systems with 10 test rounds for each of the 5 areas (302, 304, 306, 308, 310). More particularly, charts (a) through (e) are associated with OpenBMap; charts (f) through (j) are associated with Skyhook; and charts (k) through (l) are associated with Google Location Service. Each system had its own database. OpenBMap has only about 5,000 hotspots available in their database for the areas that we conducted the experiments. To compensate, more hotspots labels were added from WiGLE to enlarge the database to over 25,000 hotspots. Skyhook provides a Python API to submit online location queries, but there is no information about its database. Google Location Service also had a similar situation and it required (by default) GPS to achieve an accurate localization, though WiFi-based localization was used to complement the GPS. To provide a fair comparison, GPS was disabled when issuing queries to Google in JSON format through Google Maps Geolocation API. OpenBMap returned a location containing only latitude and longitude, while both Skyhook and Google returned a JSON response, which included the estimated location and an "accuracy indicator" of the estimated location represented as the radius of a circle around the given location.

As shown in FIGS. 10 and 11, the present framework outperformed all 3 commercial systems (i.e., OpenBMap Offline Localization System, Skyhook Precision Location Service, and Google Location Service). Generally, all 4 systems performed better in smaller areas (e.g., 302, 304, 306, and 308) than larger areas (e.g., 310 and 312) but the present framework has a significantly performance (both in statistics and distributions) in outdoor localization compared with others.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer system for outdoor localization, comprising:
   a non-transitory memory device for storing computer-readable program code; and
   a processor in communication with the memory device, the processor being operative with the computer-readable program code to perform operations including:
   using one or more manifolds, estimating locations of a particular user device and a hotspot associated with a query record received during an online location query; and
   returning the location of the particular user device back to the particular user device;
   wherein estimating the location of the particular user device comprises:
   retrieving a subset of hotspots from the one or more manifolds that are relevant to the query record;
   constructing a signal sub-matrix based on the subset of hotspots;
   constructing a hotspot location sub-manifold based on the signal sub-matrix and the one or more manifolds;
   constructing a user device location sub-manifold based on the signal sub-matrix and the one or more manifolds; and
   estimating the location of the particular user device based on the hotspot location sub-manifold and the user device location sub-manifold;
   wherein the one or more manifolds are constructed via (a)-(d):
   (a) receiving a set of hotspot labels from one or more user devices connected to an outdoor wireless local area network,
   (b) preprocessing the set of hotspot labels by filtering out one or more hotspot labels in the set of hotspot labels,
   (c) constructing a signal matrix for the preprocessed set of hotspot labels, wherein an entry in the signal matrix represents a Received Signal Strength Indicator for a given hotspot and a given hotspot label, and
   (d) performing manifold learning based on Received Signal Strength Indicators in the signal matrix to construct the one or more manifolds.

2. The computer system of claim 1 wherein a crowdsensing application is installed on the one or more user devices to generate the set of hotspot labels.

3. The computer system of claim 1 wherein at least one of the hotspot labels includes, for a discovered hotpot, a Basic Service Set Identifier, a Service Set Identifier, a Received Signal Strength Indicator, a location, signal statistics or a combination thereof.

4. The computer system of claim 1 wherein the processor is operative with the computer-readable program code to perform the manifold learning by performing a Laplacian Eigenmaps method.

5. A method of outdoor localization, comprising:
receiving a query record during an online location query;
estimating, using one or more manifolds, a location of a particular user device associated with the query record; and
in response to the query record, returning the location of the particular user device to the particular user device;
wherein estimating the location of the particular user device comprises:
retrieving a subset of hotspots from the one or more manifolds that are relevant to the query record;
constructing a signal sub-matrix based on the subset of hotspots;
constructing a hotspot location sub-manifold based on the signal sub-matrix and the one or more manifolds;
constructing a user device location sub-manifold based on the signal sub-matrix and the one or more manifolds; and
estimating the location of the particular user device based on the hotspot location sub-manifold and the user device location sub-manifold;
wherein the one or more manifolds are constructed via (a)-(b):
(a) receiving a set of hotspot labels from one or more user devices connected to an outdoor wireless local area network;
(b) performing manifold learning based on the set of hotspot labels to construct one or more manifolds, wherein performing the manifold learning comprises constructing a user device location manifold and a hotspot location manifold based on a signal matrix, wherein an entry in the signal matrix represents a Received Signal Strength Indicator (RSSI) for a given hotspot and a given hotspot label.

6. The method of claim 5, further comprising:
initiating, by a crowdsensing application installed on the one or more user devices, a hotspot discovery process;
recording the set of hotspot labels for hotspots discovered during the hotspot discovery process; and
transmitting, by the crowdsensing application, the set of hotspot labels.

7. The method of claim 5, further comprising preprocessing the set of hotspot labels and performing the manifold learning on the preprocessed set of hotspot labels.

8. The method of claim 7, wherein preprocessing the set of hotspot labels comprises:
removing, from the set of hotspot labels, hotspot labels with significant errors in location.

9. The method of claim 7, wherein preprocessing the set of hotspot labels comprises:
removing, from the set of hotspot labels, hotspot labels that are determined to be mobile.

10. The method of claim 7, wherein preprocessing the set of hotspot labels comprises:
combining, within the set of hotspot labels, hotspot labels with same or similar locations.

11. The method of claim 7, wherein preprocessing the set of hotspot labels comprises:
constructing a signal matrix for the set of hotspot labels, wherein an entry in the signal matrix represents a Received Signal Strength Indicator (RSSI) for a given hotspot and a given hotspot label.

12. The method of claim 5 wherein performing the manifold learning comprises performing a Laplacian Eigenmaps method.

13. The method of claim 5 wherein performing the manifold learning further comprises:
converting the RSSI to a weight using a non-linear transformation; and
constructing weighted adjacency matrices for the user device location manifold and the hotspot location manifold based on the weight.

14. The method of claim 13 wherein the non-linear transformation comprises $$\tilde{s}_{ij} = \exp\left(-\frac{(s_{ij} - s_{max})^2}{2\sigma^2}\right)$$

wherein $\tilde{s}_{ij}$ represents the weight, $s_{ij}$ represents the RSSI for a j-th hotspot in an i-th label, $s_{max}$ denotes a maximum RSSI a user device can receive in an outdoor environment, and a denotes a Gaussian kernel width.

15. A method of outdoor localization, comprising:
receiving a set of hotspot labels from one or more user devices connected to an outdoor wireless local area network;
performing manifold learning based on the set of hotspot labels to construct one or more manifolds;
estimating, using the one or more constructed manifolds, a location of a particular user device associated with a query record received during an online location query; and
returning the location of the particular user device to the particular user device;
wherein performing the manifold learning comprises constructing a user device location manifold and a hotspot location manifold based on a signal matrix, wherein an entry in the signal matrix represents a Received Signal Strength Indicator (RSSI) for a given hotspot and a given label; and
wherein estimating the location of the particular user device comprises:
retrieving a subset of hotspots from the hotspot location manifold that are relevant to the query record;
constructing a signal sub-matrix based on the subset of hotspots;
constructing a hotspot location sub-manifold based on the signal sub-matrix and the hotspot location manifold;
constructing a user device location sub-manifold based on the signal sub-matrix and the user device location manifold; and
estimating the location of the particular user device based on the hotspot location sub-manifold and the user device location sub-manifold.

16. The method of claim 15, wherein estimating the location of the particular user device comprises:
combining the hotspot location sub-manifold and the user device location sub-manifold into a unified sub-manifold; and
finding an optimal location that minimizes fitting errors with known locations.

17. The method of claim 16 wherein finding the optimal location comprises determining $$p^* = (K + \gamma L)^{-1} Ky$$

wherein $p^*$ represents the optimal location, K represents an indication matrix, $\gamma$ is a regularization term, L is a Laplacian graph, and y denotes the known locations.

18. One or more non-transitory computer-readable media having stored thereon program code, the program code executable by a computer to perform steps comprising:

receiving a set of hotspot labels from one or more user devices connected to an outdoor wireless local area network;

constructing a signal matrix for the hotspot labels, wherein entries in the signal matrix represent Received Signal Strength Indicators for hotspots;

performing manifold learning based on the Received Signal Strength Indicators in the set of hotspot labels to construct one or more manifolds, wherein the one or more manifolds are configured to estimate a location of a particular user device associated with a query record received during an online location query and return the location of the particular user device; and returning the location of the particular user device to the particular user device;

wherein estimating the location of the particular user device comprises:

retrieving a subset of hotspots from the one or more manifolds that are relevant to the query record;

constructing a signal sub-matrix based on the subset of hotspots;

constructing a hotspot location sub-manifold based on the signal sub-matrix and the one or more manifolds;

constructing a user device location sub-manifold based on the signal sub-matrix and the one or more manifolds; and estimating the location of the particular user device based on the hotspot location sub-manifold and the user device location sub-manifold.

19. The one or more non-transitory computer-readable media of claim 18 wherein the query record comprises information associated with a list of one or more hotspots detected by a client application.

* * * * *